United States Patent [19]

Minamida et al.

[11] Patent Number: 4,574,897
[45] Date of Patent: * Mar. 11, 1986

[54] COMBINATORIAL WEIGHING APPARATUS

[75] Inventors: Kazukiyo Minamida, Shiga; Yugo Fujitani, Ohtsu, both of Japan

[73] Assignee: Kabushiki Kaisha Ishida Koki Seisakusho, Kyoto, Japan

[*] Notice: The portion of the term of this patent subsequent to Aug. 28, 2001 has been disclaimed.

[21] Appl. No.: 625,853

[22] Filed: Jun. 28, 1984

Related U.S. Application Data

[63] Continuation of Ser. No. 414,678, Sep. 3, 1982.

[30] Foreign Application Priority Data

Sep. 4, 1981 [JP] Japan .................. 56-139980

[51] Int. Cl.⁴ .................. G01G 13/16; G01G 19/22
[52] U.S. Cl. .................. 177/25; 177/59; 209/592
[58] Field of Search ............. 177/1, 25, 59, DIG. 12; 364/567; 209/592

[56] References Cited

U.S. PATENT DOCUMENTS 4,467,880 8/1984 Minamida et al. ............. 177/59 X

Primary Examiner—E. A. Goldberg
Assistant Examiner—Patrick W. Foster
Attorney, Agent, or Firm—Staas & Halsey

[57] ABSTRACT

Disclosed in a combinatorial weighing apparatus having a plurality of weighing hoppers, a plurality of weighing machines, associated with respective ones of the weighing hoppers, for weighing or counting articles introduced into each of the weighing hoppers, and a chute for collecting the articles discharged from the weighing hoppers. The apparatus operates by computing combinations based on weight values provided by the weighing machines, and causing weighing hoppers, belonging to a combination selected as a result of the combinatorial computations, to discharge their articles into the chute one hopper at a time with a predetermined time delay intervening between the discharge operations.

4 Claims, 9 Drawing Figures

COMBINATORIAL WEIGHING APPARATUS

This is a continuation of co-pending application Ser. No. 414,678 filed on Sept. 3, 1982.

BACKGROUND OF THE INVENTION

This invention relates to a combinatorial weighing apparatus and, more particularly, to a combinatorial weighing apparatus of the type that operates by finding the weights of articles charged into a plurality of weighing hoppers, and discharging from proper ones of the weighing hoppers those articles which, in combination (referred to as the "best" combination"), give a total weight equal to a set target weight or closest to the set target weight within preset allowable limits.

It is general practice to employ a computerized combinatorial weighing apparatus, referred to as a computer scale, when weighing out a category of articles having widely different unit weights from one to another. Examples of such articles are vegitables and fruits, confectioneries, perishables and fabricated parts. As shown in FIG. 1, a combinatorial weighing apparatus of the aforementioned type operates by measuring the weights of articles charged into a plurality of weighing hoppers 2-1, 2-2, . . . 2-n, the measurements being performed by weighing machines 3-1, 3-2, . . . 3-n provided on the respective weighing hoppers, selecting the combination of articles that gives a total weight closest to a preset target weight within preset allowable limits, the selection being based upon the weights measured by the weighing machines, discharging the selected articles from the weighing hoppers containing them, collecting the discharged articles in a collecting chute 4 and delivering them to a timing hopper 5, subsequently replenishing the emptied weighing hoppers with new articles to be weighed, finding the next combination of articles to be discharged, and then repeating the foregoing cycle to continue the weighing out of articles in automatic fashion.

FIG. 2 illustrates the general construction of the combinatorial weighing apparatus described above. Numeral 1 denotes a dispersing table of vibratory conveyance type. Articles to be weighed are introduced onto the dispersing table 1 and imparted with vibratory motion for a predetermined length of time so as to be dispersed radially outwardly from the center of the table. Numerals 2-1, . . . 2-n denote n-number of weighing stations which are arranged around the dispersing table 1 along radially extending lines to receive the articles dispersed by the table. Each weighing station includes a dispersing feeder $2a$, a pool hopper $2b$, a pool hopper gate $2c$, a weighing hopper $2d$, a weight sensor (weighing machine) 3, a weighing hopper gate $2f$, and a hopper drive unit $2g$. The dispersing feeder $2a$ is an independently vibratable conveyance device for feeding the articles by means of vibration, and includes an electromagnet $2a$-1 and a trough $2a$-2 which is vibrated by the magnet $2a$-1. Each dispersing feeder $2a$ is so arranged that the articles received from the centrally located dispersing table 1 can be introduced into the corresponding pool hopper $2b$ disposed therebelow. The pool hopper gate $2c$ is provided on each pool hopper $2b$ in such a manner that the articles received in the pool hopper $2b$ are released into the weighing hopper $2d$ when the pool hopper gate $2c$ is opened under the control of the corresponding hopper drive unit $2g$. Each weight sensor 3, accompanying a respective one of the weighing hoppers $2d$, is operable to measure the weight of the articles introduced into the corresponding weighing hopper, and to apply an electrical signal indicative of the measured weight to a combination control unit, shown in FIG. 2. The combination control unit then selects the combination of articles (known as the "best" combination) that gives a total weight equal to a target value or closest to the target value within preset allowable limits, as will be described below in further detail. Each weighing hopper $2d$ is provided with its own weighing hopper gate $2f$. Only the weighing hopper gates $2f$ of those weighing hoppers that give the best combination are opened under the control of the hopper drive units $2g$, these gates $2f$ discharging the articles into a common chute 4 where they are collected together. The collecting chute 4 has the shape of a funnel and is so arranged as to receive the articles from any of the circularly arrayed weighing hoppers $2d$ via the hopper gates $2f$, which are located above the funnel substantially along its outer rim. The articles received by the collecting chute 4 are collected at the centrally located lower end thereof by falling under their own weight or by being forcibly shifted along the inclined wall of the funnel by a mechanical scraper or the like, which is not shown.

In operation, articles are charged into each of the pool hoppers $2b$ and weighing hoppers $2d$. The weighing sensors 3 associated with the weighing hoppers $2d$ measure the weights of the articles and supply the combination control unit, not shown, with signals indicative of the measured weight values, denoted $L_1$ through $L_n$. The combination control unit computes combinations based on the weight values $L_1$ through $L_n$ and selects the best combination of articles that gives a total weight closest to a target weight within preset allowable limits. The hopper drive units $2g$ respond by opening the prescribed weighing hopper gates $2f$ based on the best combination, whereby the articles giving said best combination are released into the collecting chute 4 from the corresponding weighing hoppers $2d$ to be fed into the timing hopper 5. This will leave the selected weighing hoppers $2d$ empty. Subsequently, therefore, the pool hopper gates $2c$ corresponding to the empty weighing hoppers $2d$ are opened to introduce a fresh supply of the articles from the respective pool hoppers $2b$ into said weighing hoppers $2d$, leaving these pool hoppers $2b$ empty. Accordingly, the dispersing feeders $2a$ which correspond to the empty pool hoppers $2b$ are vibrated for a predetermined period of time to deliver a fresh supply of the articles to these pool hoppers. This restores the weighing apparatus to the initial state to permit resumption of the control operation for selecting the best weight combinations in the manner described. Thus, weighing by the combinatorial weighing apparatus may proceed in continuous fashion by repeating the foregoing steps.

FIGS. 3 and 4 illustrate another example of a combinatorial weighing apparatus of the above type, improved to raise the discharge rate of the articles. Here the apparatus is provided with inner and outer chutes $4a$, $4b$ having upper open ends $4c$, $4d$ which are concentrically arranged, and lower open ends $4e$, $4f$ arranged side by side, with the inner chute $4a$ penetrating through the conical wall of the outer chute $4b$ at the middle portion thereof. Each of the weighing hoppers 2-1, 2-2, . . . 2-n is provided with a pair of independently openable weighing hopper gates $2f_1$, $2f_2$. According to this arrangement, opening predetermined ones of the weighing hopper gates makes it possible to discharge articles selectively into the inner and outer chutes 4a, 4b from the weighing hoppers. With a combinatorial weighing apparatus of this kind, the weights of the articles fed into the weighing hoppers 2-1, 2-2, ... 2-n are weighed by the respective weight sensors 3-1, 3-2, ... 3-n, and signals indicative of the weighed values are sent to a combination control unit, which is not shown, for computing combinations based upon these weight values. More specifically, the combination control unit is adapted to either (a) simultaneously select two "best" combinations giving first best and second best values equal to a target weight or closest to the target weight within preset allowable limits, or (b) select one "best" combination, as defined above, and then recompute combinations based on the remaining weight values and select another single "best" combination based on this second round of computations. When two sets of combinations have been selected through either of the above methods, the weighing hopper gates $2f_1, 2f_1 \ldots$ of the weighing hoppers corresponding to the first selected combination are opened to discharge their articles into, say, the inner chute 4a, and the weighing hopper gates $2f_2, 2f_2 \ldots$ of the weighing hoppers corresponding to the second selected combination are opened to discharged their articles into the outer chute 4b. Both sets of the discharged articles are collected by the respective inner and outer chutes 4a, 4b and delivered to timing hoppers 5, 5'.

Various configurations of the above-described combinatorial weighing apparatuses exist, but in all of them one or a plurality of combinations are selected in each single weighing cycle, and the articles are discharged from the selected weighing hoppers at one time. In other words, with the conventional combinatorial weighing arrangements, a discharge command signal is transmitted to all of the selected weighing hoppers simultaneously, causing these hoppers to release their articles into the chute 4 (FIG. 1), or into the inner and outer chutes 4a, 4b (FIG. 3), at the same time. As the articles discharged en masse in this fashion converge at the bottom opening of the chute, therefore, the opening is likely to be blocked as articles of a poor flowability exhibit a bridging phenomenon and pile up faster than they can be delivered from the opening. This makes it impossible to deliver the articles to the awaiting timing hopper. An additional defect is exhibited by the combinatorial weighing apparatus of FIG. 3 having two article discharge paths, wherein the discharged articles, irrespective of their flowability, form bridges and pile up also at the portion of the outer chute 4b, where it is narrowed by the intersecting inner chute 4a, when a large quantity of the articles are released into the outer chute 4b at one time. This prevents the delivery of the articles from the outer chute.

SUMMARY OF THE INVENTION

Accordingly, an object of the present invention is to provide a combinatorial weighing apparatus in which discharged articles will not form bridges and pile up at the lower opening of a collecting chute.

Another object of the present invention is to provide a combinatorial weighing apparatus in which discharged articles can be delivered from a collecting chute in reliable fashion regardless of the type of article or the shape of the chute.

A further object of the present invention is to provide a combinatorial weighing apparatus in which an article discharge command signal is successively delivered, after a suitable time delay, to each weighing hopper selected by a combinatorial computation cycle, whereby said weighing hoppers may be opened in successive fashion to discharge their articles into a collecting chute in turn.

Other features and advantages of the invention will be apparent from the following description taken in conjunction with the accompanying drawings in which like reference characters designate the same or similar parts throughout the figures thereof.

DESCRIPTION OF THE PREFERRED EMBODIMENT

Figure 1:
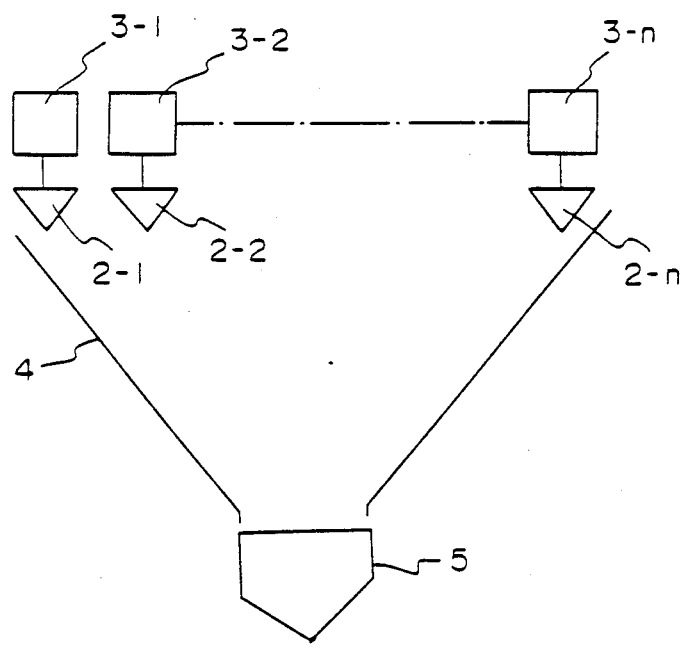
FIGS. 1 and 3 are schematic views illustrating examples of a combinatorial weighing apparatus according to the prior art.
Figure 2:
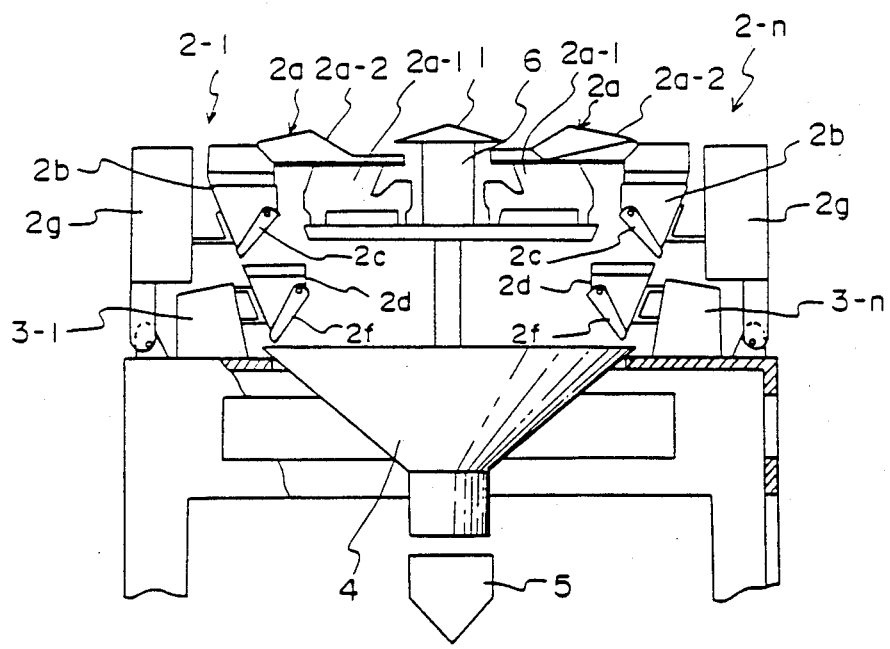
FIG. 2 is a view showing the detailed construction of the combinatorial weighing apparatus depicted in FIG. 1.
Figure 3:
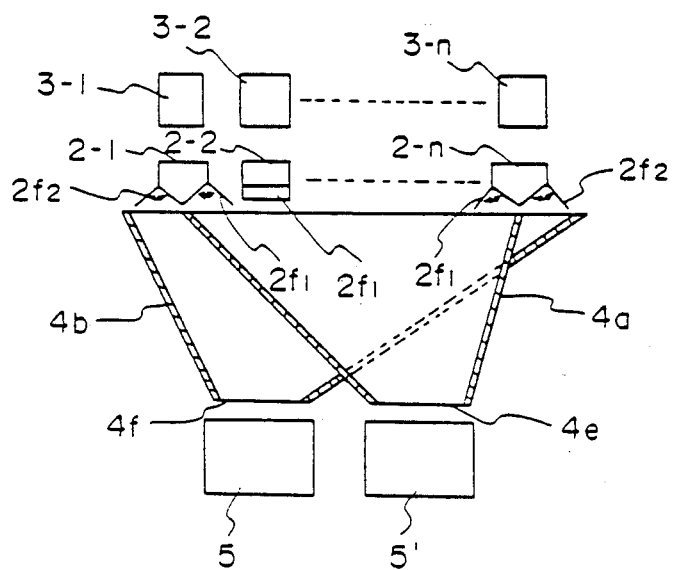
Figure 4:
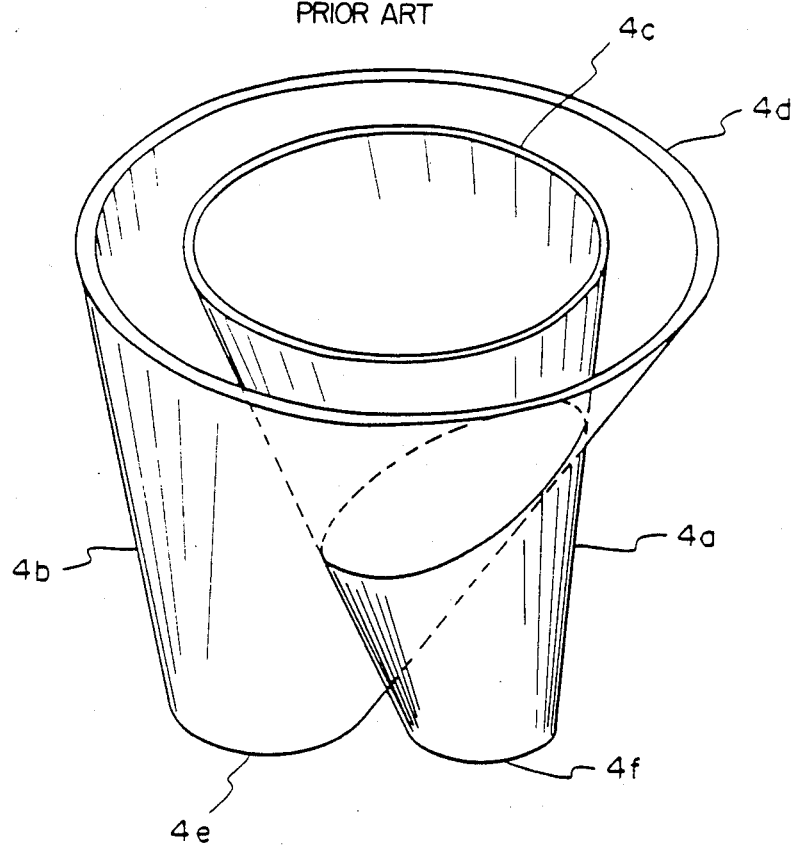
FIG. 4 is a perspective view of the collecting chutes shown in FIG. 3.
Figure 5:
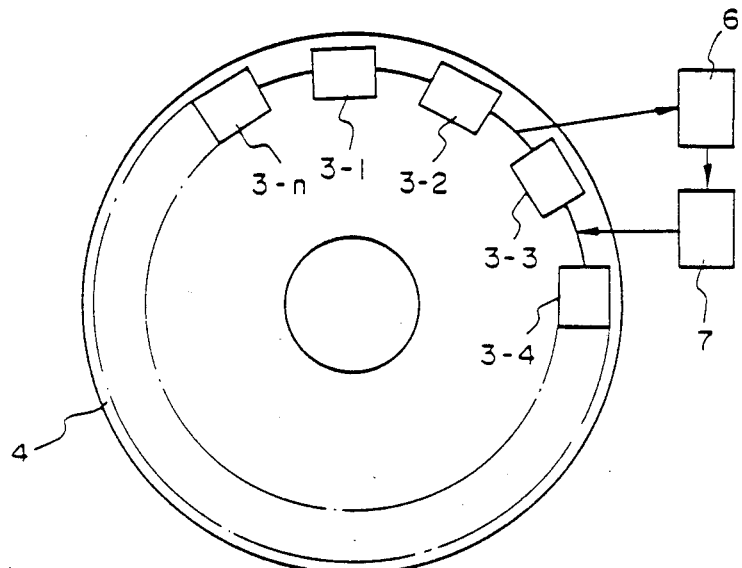
FIGS. 5 and 6 are schematic views illustrating an embodiment of the present invention.
Figure 6:
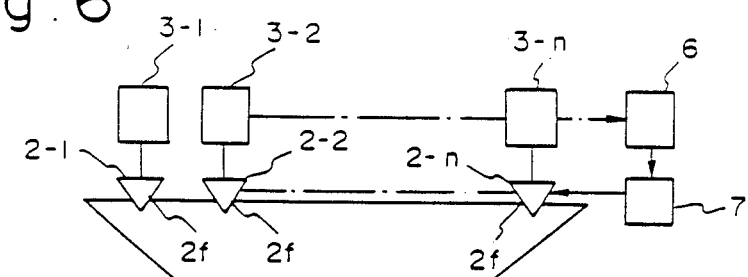

Referring to FIGS. 5 and 6, a combinatorial weighing apparatus in accordance with the present invention includes weighing hoppers 2-1, 2-2, ... 2-n for receiving suitable quantities of articles to be weighed, weight sensors 3-1, 3-2, ... 3-n for weighing the articles received in respective ones of the weighing hoppers 2-1, 2-2, ... 2-n, and a chute 4, in the shape of an inverted frusto-cone, for collecting the articles discharged from the weighing hoppers. The weighing hoppers 2-1, 2-2, ... 2-n and associated weight sensors 3-1, 3-2, ... 3-n are arrayed above the outer rim of the cone 4 and equally spaced from one another, as will be understood from FIG. 5. Each weighing hopper 2-1, 2-2, ... 2-n has an openable weighing hopper gate $2f$ provided at the lower portion thereof, with predetermined ones of the weighing hopper gates $2f$ being opened in response to a discharge command signal to release the corresponding articles into the chute 4. Also provided are a combination computing unit 6, to which the weight sensors 3-1, 3-2, ... 3-n are connected to supply the unit with signals indicative of the measured weight values, and a discharge control unit 7 connected between the combination computing unit 6 and each of the weighing hoppers 2-1, 2-2, ... 2-n to successively provide the weighing hoppers, belonging to a combination selected on the basis of computations performed by the computing unit 6, with a discharge command signal delivered to one after another of the hoppers with a predetermined time delay intervening between each delivery of the signal. In this example the discharge control unit 7 sends the discharge command signal to the selected hoppers in increasing numerical order.

In operation, the weight sensors 3-1, 3-2, ... 3-n weigh the articles introduced into the respective weighing hoppers 2-1, 2-2, ... 2-n, and deliver signals indicative of these weights to the combination computing unit 6. The latter responds by computing combinations based on the weight values, and by selecting one combination that gives a total weight value equal to a preset target weight or closest to the target weight within preset allowable limits. For example, assume that the combination computing unit 6 selects the five weight sensors 3-1, 3-3, 3-5, 3-8, 3-n as making up the best combination. The combination computing unit 6, immediately upon selecting this combination, provides the discharge control unit 7 with a discharge command signal for each of the weighing hoppers 2-1, 2-3, 2-5, 2-8, 2-n that correspond to the selected weight sensors 3-1, 3-3, 3-5, 3-8, 3-n. In turn, the discharge control unit 7 sends the acquired discharge command signals, after successive predetermined time delays, to the weighing hoppers in increasing numerical order, that is, to weighing hoppers 2-1, 2-3, 2-5, 2-8, 2-n in the order mentioned. The weighing hoppers, upon receipt of the discharge command signal, successively release their articles into the chute 4 as their respective weighing hopper gates 2f are opened in the above-mentioned order in response to the discharge signal. When the last weighing hopper 2-n releases it articles so that all of the selected weighing hoppers 2-1, 2-3, 2-5, 2-8, 2-n are empty, these hoppers are supplied afresh with articles by means of corresponding pool hoppers, not shown. The weight sensors 3-1, 3-3, 3-5, 3-8, 3-n corresponding to the resupplied weighing hoppers weigh the newly supplied articles and send signals indicative of the measured weights to the combination computing unit 6. The latter again computes combinations based on the weight values just transmitted and on the already known weight values which were not selected by the previous combinatorial computation operation, and selects the best combination based on this latest round of computations. These operations are repeated to discharge articles from selected weighing hoppers into the chute 4 in continuous fashion.

In discharging the articles, the weighing hoppers selected as the result of the combinatorial computations have their weighing hopper gates 2f, 2f . . . opened one after another, with a suitable time delay intervening between each opening operation, in accordance with the discharge command signals from the discharge control unit 7, so that the articles are released into the chute 4 successively rather than en masse. In other words, as a result of the foregoing operations, articles from one weighing hopper at a time flow through the chute 4 so that the articles do not form bridges and pile up at the constricted portion of the chute, enabling all kinds of articles to be delivered in reliable fashion. An additional advantage is that the chute 4 can be reduced in size since only small quantities of the articles flow down the chute at any given time.

It is obvious that the weighing hoppers 2-1, 2-2, . . . 2-n can be made to discharge their articles in decreasing numerical order, and that the discharge of articles can take place in random fashion when the weighing hoppers are circularly arrayed. What is essential is that the weighing hoppers release their articles in turn with a prescribed time delay intervening between each release.

Figure 7:
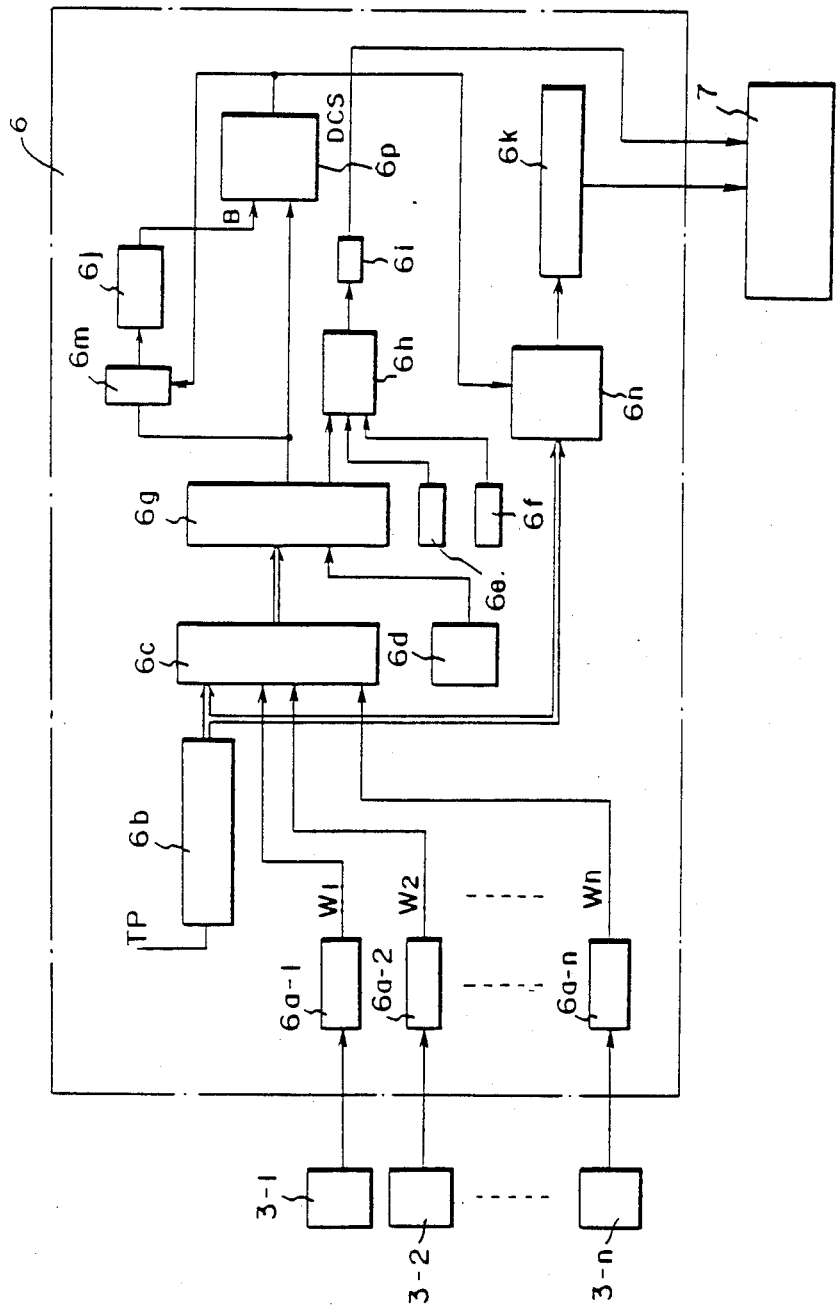
FIG. 7 is a block diagram of a combination computing unit shown in FIGS. 5 and 6.

Reference will now be had to the block diagram of FIG. 7 for a fuller description of the construction and operation of the combination computing unit 6 shown in FIGS. 5 and 6. The combination computing unit 6 includes registers 6a-1, 6a-2, . . . , 6a-n for storing weight values W1, W2, . . . Wn delivered by respective weight sensors 3-1, 3-2, . . . 3-n, and an n-bit counter 6b for counting timing pulses TP of a predetermined frequency, and for generating combinations of the n-number of weighing machines. These combinations will also be referred to as "combination patterns" where appropriate. Specifically, for n-number of weighing hoppers, n combinations are possible when each combination is composed of one weighing hopper from the total of n weighing hoppers, n(n-1)/2! combinations are possible when each combination is composed of two weighing hoppers selected from said total, and, in general, n(n-1)(n-2) . . . (n-r+1)/r! combinations are possible when each combination is composed of r-number of weighing hoppers selected from said total of n weighing hoppers. Accordingly, when the n-bit binary counter 6b has counted $2^n - 1$ timing pulses TP, a total of $2^n - 1$ different bit patterns, from 000 . . . 001 to 111 . . . 111, will have been generated. Therefore, if a correlation is established between the first bit and the first weight sensor 3-1, between the second bit and the second weight sensor 3-2, and between third through n-th bits and the third through n-th weight sensors 3-3 through 3-n, respectively, then the generated bit pattern will be an indication of the abovementioned combination pattern.

The generated bit pattern, indicative of the value of the count in counter 6b, is applied to a multiplexer 6c. The latter provides an arithmetic unit 6g with the weight values stored in those registers 6a-1, 6a-2, . . . 6a-n, for the corresponding weight sensors, specified by the bit pattern. For instance, if the value of the count is 1000101011 when n=10, then the arithmetic circuit 6g will receive the weight value outputs W1, W2, W3, W4, W6, W10 from the first, second, fourth, sixth and tenth weight sensors 3-1, 3-2, 3-4, 3-6 and 3-10, respectively. The arithmetic unit 6g also receives a signal $W_a$, indicative of a target value, from a target weight register 6d which stores the target weight. Numerals 6e and 6f denote upper and lower limit setting devices, respectively, for storing preset allowable limits (namely an upper limit or maximum value Ma, and a lower limit or minimum value Mi, respectively) for weight values. The minimum value Mi is set equal to the target value, as is customary. If it were set lower than the target value, the result could be delivery of articles having a total weight less than that intended, and complaints might ensue.

The arithmetic unit 6g computes, and delivers a signal indicative of, the gross weight $\Sigma W_i(=X)$ of the weight values received from the multiplexer, and also computes the difference between the gross weight $\Sigma W_i$ and the target value $W_a$. The arithmetic unit 6g produces a signal A indicating the absolute value of the computed difference. More specifically, the arithmetic unit 6g performs the operations:

$$\Sigma W_i = X \qquad (1)$$

$$|\Sigma W_i - W_a| = A \qquad (2)$$

and produces a signal representing the total weight $\Sigma W_i(=X)$, as well as a signal A representing the absolute value (hereafter referred to simply as the "deviation") of the difference between the gross weight $\Sigma W_i$ and the set target weight $W_a$. The value X is applied to a comparator 6h, whose output is connected to a counter 6i. The comparator 6h discriminates whether the gross weight X lies in the range defined by $M_i$ and $M_a$. Specifically, if the following relation holds:

$$M_i \leq X \leq M_a \qquad (3)$$

then the comparator 6h will increment (count up) the counter 6i by one. A minimum deviation register 6j for storing the minimum deviation is set automatically to the deviation A the first time only, and thereafter is updated as the conditions warrant, as will be described later. In the case where the minimum value $M_i$ is set equal to the target weight value, it is permissible to initially set the minimum deviation register 6j to the difference between the maximum value $M_a$ and the target value. A best combination memory 6k is adapted to store the best combination pattern. Numerals 6m and 6n denote gates. When the gross weight $\Sigma W_i$ is within the preset allowable limits, a comparator 6p compares the deviation value A, namely the output of the arithmetic unit 6g, with the minimum deviation value, denoted by B, stored in the minimum deviation register 6j. When the inequality A < B holds, the output of comparator 6p is such that the deviation value A is delivered for storage to the minimum deviation register 6j through the gate 6m, and the content (combination pattern) of counter 6b is delivered for storage to the best combination memory 6k.

Numeral 7 denotes the discharge control unit shown in FIGS. 5 and 6. When the content of counter 6i is one or more, the discharge control unit 7, which receives a signal from memory 6k indicative of the best combination pattern, is operable to open the weighing hopper gates 2f (FIG. 6) specified by the best combination pattern, so that the corresponding weighing hoppers discharge their articles into the collecting chute 4, and to open the corresponding pool hopper gates so that the emptied weighing hoppers may be replenished with articles.

The operation of the combination control unit 6 will now be described in brief. At the beginning, each of the weighing hoppers 2-1, 2-2, ... 2-n contain a supply of the articles. The weight sensors 3-1, 3-2, ... 3-n measure the weights of the articles and produce the weight values W1 through Wn which are sent to the combination control unit 6 for storage in the registers 6a-1, 6a-2 ... 6a-n, respectively. The n-bit (n=10) counter 6b counts the timing pulses TP having the predetermined frequency to produce $2_n-1$ combination patterns. Thus, when the first timing pulse TP arrives and is counted, the content of counter 6b becomes 0000000001. As a result, the multiplexer 6c sends the first weight value signal W1, from the first weight sensor 3-1 and stored in the register 6a-1, to the arithmetic circuit 6g, which responds by performing the operations specified by equations (1) and (2) above, thereby producing the signals indicative of the gross weight $\Sigma W_i$ of the combination and of the deviation A $(=|W_1-W_a|)$ between $\Sigma W_i$ and the set target value $W_a$. Since the gates 6m, 6n are open for the initial combinatorial computation, the deviation value A is transferred to and stored in the minimum deviation register 6j, and the content (the combination pattern 0000000001) of n-bit counter 6b is stored in the best combination memory 6k. Comparator 6h compares the gross weight $\Sigma W_i(=X)$ against the maximum value $M_a$ and the minimum value $M_i$, and increments the counter 6i when the relation $M_i \leq X \leq M_a$ holds. Thenceforth, when the second timing pulse TP is generated, the pulse is counted by counter 6b, whose content (combination pattern) is incremented to 0000000010. Consequently, the weight value output W2 of the weight sensor 3-2 provided on the second weighing hopper, which weight value is stored in the register 6a-2, is delivered to the arithmetic unit 6g which then performs the operations of equations (1) and (2) to produce the signals indicative of the gross weight $\Sigma W_i(=X)$ and of the deviation value A $(=|W_2-W_a|)$. The comparator 6h then determines whether equation (3) is satisfied; if it is, then the content of counter 6i is incremented by one. The comparator 6p, meanwhile, compares the deviation value A with the content B $(=|W_1-W_a|)$ of the minimum deviation register 6j. If the relation $A \geq B$ holds, then neither the register 6j nor the best combination memory 6k is updated; if A < B holds, the deviation value A is transferred to and stored in register 6j, and the content of counter 6b is transferred to and stored in memory 6k. The operation described above is repeated until all $2^n-1$ combinations have been generated. At such time the content of the minimum deviation register 6j will be the minimum deviation value obtained from the $2^n-1$ combinations, and the content of the best combination memory 6k will be the combination pattern that gave said minimum value. The best combination is thus selected from the total of $2^n-1$ possible combination patterns. Thenceforth, when the value of the count in counter 6i is one or more, the output of the counter 6i, namely a discharge start signal DCS (now logical "1"), and the combination pattern stored in the best combination memory 6k, are applied to the discharge control unit 7. When the value of the count in counter 6i is one or more, the discharge control unit 7 successively opens the hopper gates 2f of those weighing hoppers corresponding to the "1" bits of the input combination pattern, the designated hopper gates opening in turn with the prescribed intervening time delay, whereby the articles in the corresponding weighing hoppers are discharged into the collecting chute 4, after which the discharge control unit 6 opens the corresponding pool hopper gates to replenish the emptied weighing hoppers with articles. Further, the dispersing feeders corresponding to the now-empty pool hoppers are vibrated for a fixed length of time to resupply these pool hoppers with articles. This completes one combinatorial weighing cycle, which may be repeated as often as required, to provide batches of the articles, each batch having a total weight equal or closest to the set target weight. It should be noted that when the content of counter 6i is zero in the foregoing operation, articles are not discharged and each of the weighing machines must be supplemented with articles to resume the combinatorial computations.

Figure 8:
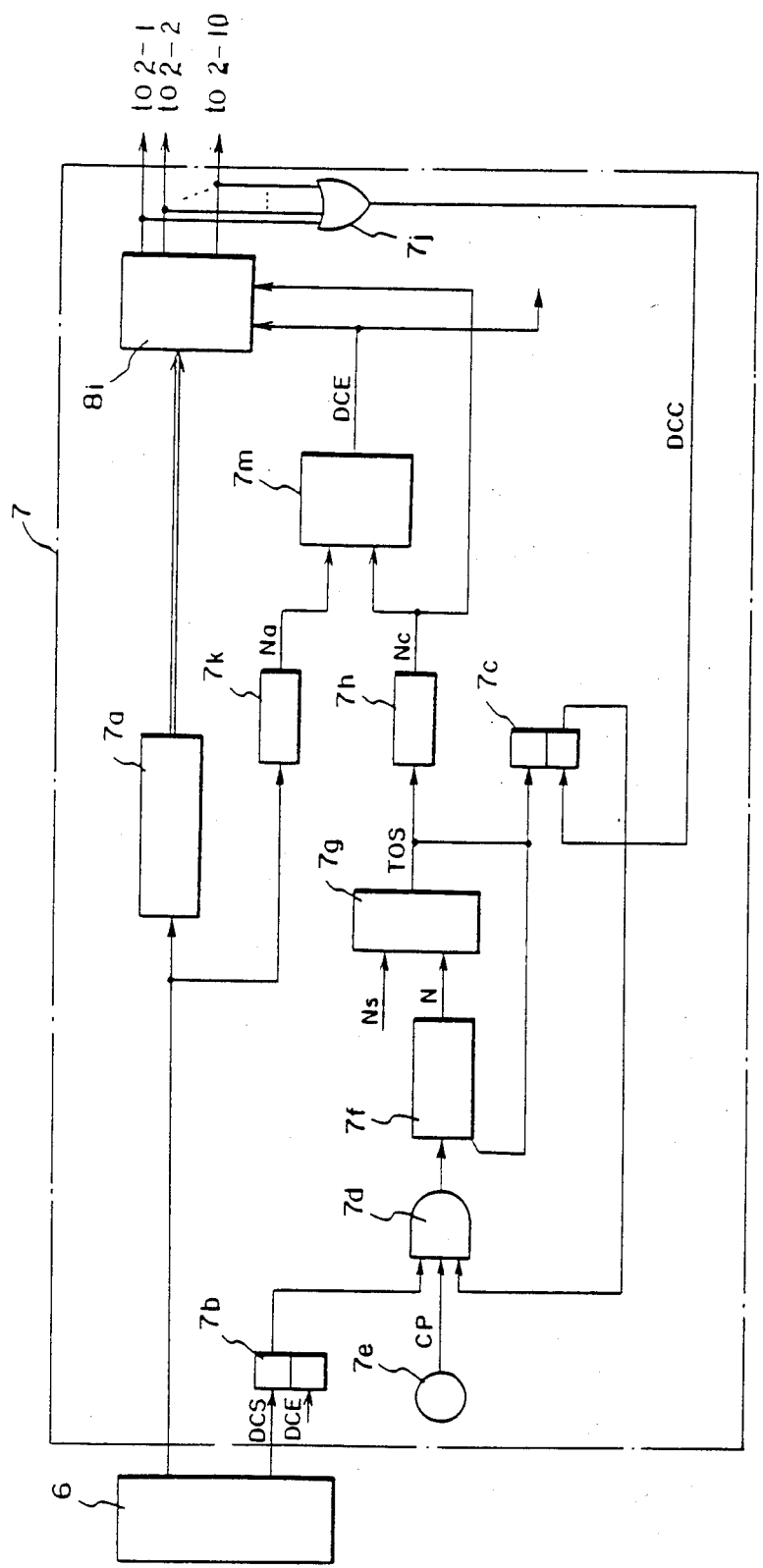
FIG. 8 is a block diagram illustrating a discharge control unit.

Referring now to FIG. 8, the discharge control unit 7 includes a memory 7a for storing the best combination pattern, assumed here to be 1000101011, received from the combination control unit 6. A flip-flop (FF) 7b, which receives the discharge start signal DCS from the combination control unit 6, is set by the signal DCS and reset by a discharge end signal DCE, namely a signal that goes to logical "1" upon the completion of a discharge operation. A flip-flop 7c, which is initially in the reset state, is set a predetermined period of time after the start of a discharge operation, and is reset after the delivery of a discharge command signal DCC to a weighing hopper, the setting and resetting operation being repeated in the manner described. When FF 7b is set by the discharge start signal DCS obtained from the combination control unit 6, an AND gate 7d is opened to provide a counter 7f with clock pulse CP of a constant frequency generated by an oscillator 7e. The clock pulses CP are counted by a counter 7f whose output N, indicative of the status of the count, is applied to a comparator 7g. The latter compares the value N with a set value Ns and produces a "time over" signal TOS when N becomes equal to Ns. The signal TOS clears the counter 7f, sets FF 7c and is applied to a counter 7h, whose status Nc is incremented to a value of one as a result. When the counted value Nc (=1) enters a controller 7i, the latter sends a discharge command signal DCC to the weighing hopper 2-1, which is that having the lowest number among the weighing hoppers 2-1, 2-2, 2-4, 2-6, 2-10 corresponding to the "1" bits in the best combination pattern 1000101011, whereby said weighing hopper is made to discharge its articles. The discharge command signal DCC is also fed through an OR gate 7j to reset FF 7c. A counter 7k is provided to store the number of "1" bits in the best combnation pattern, namely the number Nh of selected weighing hoppers (where Nh=5 in the present example). A comparator 7m constantly compares the status of the count Nc in counter 7h with the status of the count Nh in counter 7k to detect whether Nc and Nh are equal.

When Ff 7c is reset by the discharge command signal DCC, AND gate 7d opens and counter 7f again starts counting the clock pulses CP. When the value of the count N becomes equal to the set value Ns, which will occur after a predetermined period of time, the comparator 7g issues the signal TOS to clear the content of counter 7f to zero, set FF 7 and increment counter 7h (i.e., Nc) to a value of two, just as described above. The controller 7i now responds by sending a discharge command signal DCC to weighing hopper 2-2, which is that having the second lowest number, and to FF 7 to reset the same. Thenceforth, and in similar fashion, the signal TOS is produced whenever a predetermined period of time has elapsed from the issuance of the discharge end signal DCC, with the content of counter 7h being incremented by one step to three, four and then five each time the signal TOS arrives. Accordingly, the weighing hoppers 2-4, 2-6, 2-10 are provided with the discharge command signal, in the mentioned order, as the signal TOS is produced. When a total of five of the signals TOS have been generated, this is reflected by the value of the count Nc in counter 7h, establishing the condition Nc=Nh=5. When this occurs, the comparator 7m responds by issuing the discharge end signal DCE, whereby FF7b is reset and AND gate 7d closed, ending the discharge operation.

Figure 9:
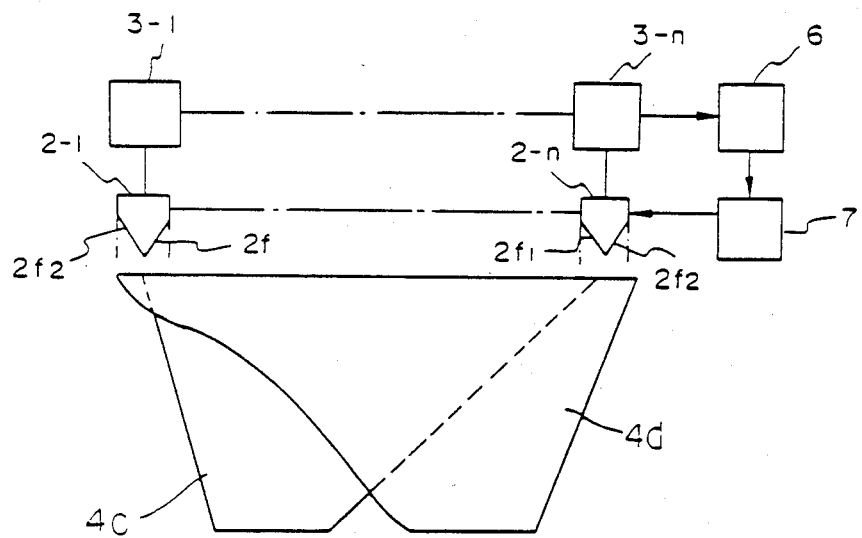
FIG. 9 is a schmatic view of another embodiment of the present invention.

Reference will now be had to FIG. 9 to describe another embodiment of a combinatorial weighing apparatus according to the present invention. The apparatus includes inner and outer chutes 4c, 4d defining independent discharge paths, and weighing hoppers 2-1, 2-2, . . . 2-n, each having two weighing hopper gates $2f_1$, $2f_2$, disposed in a circular array above chutes 4c, 4d inwardly of the rim of the outer chute 4d. The weight sensors 3-1, 3-2, . . . 3-n weigh the articles introduced into the respective weighing hoppers 2-1, 2-2, . . . 2-n, and deliver signals indicative of these weights to the combination computing unit 6. The latter responds by computing combinations based on the weight values, and by selecting two "best" combinations giving first and second total weight values equal to a preset target weight or closest to the target weight. The combination computing unit 6 then provides the discharge control unit 7 with a discharge command signal for each of the weighing hoppers selected in accordance with the combinatorial computations. The discharge control unit 7 sends the acquired discharge command signals for the first set of selected weighing hoppers, after successive predetermined time delays, to said weighing hoppers in either increasing or decreasing numerical order. These weighing hoppers, upon receipt of the discharge command signals, successively release their articles into the inner chute 4c as their inner weighing hopper gates $2f_1$ are opened in the abovementioned order in response to the discharge signals. Concurrently, or immediately after the above operations, the discharge control unit 7 sends the acquired discharge command signals for the second set of selected weighing hoppers, after successive predetermined time delays, to said weighing hoppers in either increasing or decreasing numerical order. These weighing hoppers, upon receipt of the discharge command signals, successively release their articles into the outer chute 4c as their outer weighing hopper gates $2f_2$ are opened in the abovementioned order in response to the discharge signals.

When the articles are discharged into the inner and outer chutes 4c, 4d in this manner, the discharge from the weighing hoppers 2-1, 2-2, . . . 2-n is effected one at a time with a time delay intervening between each discharge, so that large quantities of the articles do not accumulate within the chutes, particularly within the outer chute 4d where its flow path is narrowed. The articles can therefore be delivered from the chutes assuredly without forming bridges that would cause the articles to pile up.

In each of the foregoing embodiments the weighing hoppers are provided in a circular array. It should be obvious, however, that the invention can also be applied in a case where the weighing hoppers are arrayed in parallel rows, with opposing weighing hoppers being so controlled as to discharge their articles non-simultaneously.

It should also be obvious that the invention can be applied to a so-called combination computing-type automatic counting apparatus that operates by computing combinations based on a plurality of numerical values obtained by dividing weight values, obtained from a plurality of weighing machines, by the weight of each article fed into the weighing machines, these numerical values therefore indicating the numbers of the articles fed into the machines, selecting the best combination of numerical values that gives a total number equal or closest to a set number, and causing the weighing hoppers corresponding to the best combination to discharge there articles into an awaiting chute.

In accordance with the present invention as described and illustrated hereinabove, combinations are computed based on the weights of articles charged into each of a plurality of weighing hoppers disposed above a chute or chutes, a combination of these weights that gives a total weight value equal or closest to a set weight value is selected, and articles are discharged from those weighing hoppers corresponding to the selected combination. According to a feature of the invention, the selected weighing hoppers are caused to discharge one at a time in successive fashion with a time delay intervening between each discharge, thereby preventing a concentrated accumulation of the articles in the chute, as would otherwise occur if all of the selected weighing hoppers were to discharge simultaneously. This in turn prevents the articles from forming bridges and, hence, from clogging the chute, so that the articles can be recovered from the chute reliably regardless of the type of article and the shape of the chute.

Although a certain preferred embodiment has been shown and described in detail, it should be understood that many changes and modifications may be made therein without departing from the scope of the appended claims.

What we claim is:

1. A combinatorial weighing system comprising:
   means for supplying articles in a plurality of paths to provide a corresponding plurality of measured, individual batches of articles in the respective said plurality of paths, said supplying means including means for measuring the weight of each of said plurality of individual batches and producing a numerical value signal representative of the measured weight thereof and for retaining said plurality of measured article batches in the respective said paths;
   means for storing the numerical value signals of said measured batches retained in each said path and identifying each said retained batch with the corresponding, stored numerical value signal;
   means for selecting from said stored numerical value signals a specific combination of plural stored numerical values which provide a sum numerical value satisfying a predetermined condition;
   means for selectively discharging the plural, retained article batches respectively identified by said selected, specific combination of plural stored numerical values in time-sequenced intervals from the respective retaining means; and
   means for collecting said selectively and sequentially discharged, plural article batches.

2. A system as recited in claim 1 wherein:
   said selecting means selects first and second specific combinations of respective, first and second pluralities of said stored numerical values, each providing a sum value satisfying said predetermined condition;
   means associated with each said path for directing a batch retained therein, upon discharge, into a selected one of first and second separate discharge paths in accordance with the selection of the stored numerical value identifying that batch in one of said first and second specific combinations, respectively;
   said collecting means includes first and second collecting means associated in common with the respective said first and second discharge paths for separately collecting articles respectively discharged through said first and second separate discharge paths; and
   said selective discharging means selectively discharges said first and second pluralities of retained article batches identified by the respective first and second specific combinations in time-sequenced intervals through said respective first and second separate discharge paths.

3. A system as recited in claim 2, wherein said selective discharge means discharges said first and second pluralities of retained article batches of the respective said first and second specific combinations in succession.

4. A system as recited in claim 2, wherein said selective discharge means discharges said first and second pluralities of retained article batches of the respective said first and second specific combinations concurrently.

* * * * *

UNITED STATES PATENT AND TRADEMARK OFFICE
CERTIFICATE OF CORRECTION

PATENT NO. : 4,574,897                             Page 1 of 2

DATED     : March 11, 1986

INVENTOR(S) : Minamida et al.

It is certified that error appears in the above-identified patent and that said Letters Patent is hereby corrected as shown below:

Front Page [57] ABSTRACT, line 1, "in" should be --is--;

Col. 1,  line 10, "weighting" should be --weighing--;

line 14, "combination")," should be --combination),--;

line 21, "vegitables" should be --vegetables--;

line 26, "Measurements" should be --Measurement--.

Col. 3,  line 26, "discharged" should be --discharge--.

Col. 6,  line 7, "n" should be --$\underline{n}$--;

line 8, "n" should be --$\underline{n}$--;

line 14, "n" should be --$\underline{n}$--.

Col. 9,  line 1, "pulse" should be --pulses--;

UNITED STATES PATENT AND TRADEMARK OFFICE
CERTIFICATE OF CORRECTION

PATENT NO. : 4,574,897

DATED : March 11, 1986

INVENTOR(S) : Minamida et al

It is certified that error appears in the above-identified patent and that said Letters Patent is hereby corrected as shown below:

Col. 9, line 19, "combnation" should be -- combination --;

line 25 "Ff" should be -- FF --.

Signed and Sealed this

Twenty-second Day of July 1986

[SEAL]

Attest:

DONALD J. QUIGG

Attesting Officer

Commissioner of Patents and Trademarks